United States Patent [19]

Hansson et al.

[11] Patent Number: 5,980,165
[45] Date of Patent: Nov. 9, 1999

[54] INSERT HOLDER AND KEY THEREFOR

[75] Inventors: Per Hansson, Gävle; Karl-Göran Brask, Sankviken, both of Sweden

[73] Assignee: Sandvik AB, Sandviken, Sweden

[21] Appl. No.: 09/159,390

[22] Filed: Sep. 23, 1998

[51] Int. Cl.$^6$ .................................................. B23B 27/04
[52] U.S. Cl. ..................... 407/107; 407/109; 407/110; 76/80
[58] Field of Search .................................. 407/110, 109, 407/107, 50; 82/160; 76/80

[56] References Cited

U.S. PATENT DOCUMENTS

| | | | |
|---|---|---|---|
| 1,672,458 | 6/1928 | Horner | 76/80 |
| 3,175,426 | 3/1965 | Kolesh et al. | 76/80 |
| 5,035,545 | 7/1991 | Zinner | 407/110 |
| 5,697,271 | 12/1997 | Friedman et al. | |
| 5,803,675 | 9/1998 | Von Hass | 407/107 |
| 5,833,403 | 11/1998 | Barazani | 407/109 X |

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

An insert holder having a slot adapted to receive a cutting insert, a part of the slot being formed by a clamping arm. Two laterally opening seats are provided in the holder for receiving two spaced-apart projections of a key that is intended to bend the clamping arm outwards for widening the slot during the mounting and/or dismounting of a cutting insert. One of the seats has a cylindrical shape and defines a fulcrum for receiving the first projection, while the other seat has an oblong shape in order to effect outward bending of the clamping arm in response to displacement of the second projection along the oblong seat from a first point thereon located at a certain distance from the first fulcrum to a second point thereon located at a shorter distance from the fulcrum.

7 Claims, 3 Drawing Sheets

INSERT HOLDER AND KEY THEREFOR

TECHNICAL FIELD OF THE INVENTION

This invention relates to an insert holder of the type comprising a blade-shaped body having a slot adapted to receive a cutting insert, said slot being defined by an elastically flexible clamp arm arranged to resiliently clamp the cutting insert in the slot. Two seats, which open laterally, are provided in the insert holder in order to receive two spaced-apart projections of a key, said projections having the function of bending the clamping arm for widening the slot to permit the mounting or dismounting of the cutting insert. More 10 precisely, the key is turned around a fulcrum defined by one of the seats, at the same time that a projection of the key engages the other seat.

The invention also relates to a key for such insert holders and a method of manipulating the key.

PRIOR ART

Insert holders and keys of the type generally defined above are previously known in two different embodiments in U.S. Pat. No. 5,697,271. Thus, in FIGS. 1–4 of said patent an insert holder is shown having one of its key-receiving seats recessed in the flexible clamping arm while the other key-receiving seat is recessed in the body itself, more precisely at a point below the slot intended for the cutting insert. In order to widen the slot of this insert holder two types of keys are suggested, the first one being shown in FIG. 3 of the patent and having the shape of a plate with two separated legs upon which projections in the shape of studs are provided. Between said projections there is a wedge body that by the aid of a screw mechanism may increase or decrease the distance between the legs and consequently the distance between said studs. In FIG. 4 of the patent an alternative key is shown where one projection comprises a rotatable eccentric body that, when turned, is able to increase the distance between the seats of the insert holder in order to bend the clamping arm outwards. However, both of these keys are structurally relatively complicated and hence expensive to manufacture. The presence of a screw mechanism also constitutes a latent problem because the threads can become damaged or fouled.

A structurally more simple and hence cheaper key is described in connection with FIGS. 6–8 of the patent. In that case two cylindrical studs are fixed upon an elongate shaft, more precisely side by side adjacent the free end of the shaft. In connection with this key the maximum distance between the studs is determined by the width of the key shaft, said distance being relatively short and thus no stud-receiving seat may be provided in the body itself in the area below the slot intended for the insert. Accordingly one of these two studs must be applied against an abutment or in a seat in the vicinity of the clamping arm. A disadvantage of this key, which in itself is simple and inexpensive, is, however, that it requires continuous power supply in order to maintain the arm bent outwards. In other words, the clamping arm returns to its starting position as soon as the key is released. Another disadvantage is that a large manual force is required to bend the clamping arm outwards since the distance between the studs is small. A serious disadvantage is also that the bending outwards of the clamping arm takes place in an uncontrolled way. If the operator applies an excessive force upon the clamping arm, said arm may be plastically deformed and thus unusable.

OBJECTS AND FEATURES OF THE INVENTION

The present invention aims it overcoming the disadvantages mentioned above in connection with the prior art and creating an improved combination of insert holder and key. Thus, a primary object of the invention is to create an insert holder and a simple, inexpensive key in combination with each other which guarantee a predictable deflection or bending of the clamping arm while using a reasonable manual force. A further object is to create an insert holder and a key which makes it possible to automatically maintain the key tn a condition where the clamping arm is kept deflected, i.e., without applying a continuous manual force to the key.

According to the invention at least the primary object is achieved by an insert holder for holding a cutting insert, the holder comprising a blade-shaped body defining a plane. The body has a base portion which includes a first slot face, and a clamping arm which includes a second slot face spaced from the first slot face to form therewith a slot in which a cutting insert can be removably mounted. The clamping arm is joined to the base portion to be elastically movable away from the first slot face to facilitate insertion and removal of the cutting insert. First and second seats are disposed in the body for receiving respective first and second projections of a turning key to elastically move the clamping arm away from the first slot face with the first seat acting as a fulcrum. Each of the first and second seats opens in a direction laterally of the plane of the body. One of the first and second seats is disposed in the base portion, and the other of the first and second seats is disposed in the clamping arm. The second seat includes an oblong surface along which the second projection can travel between first and second portions of the oblong surface. The first portion of the oblong surface is spaced farther from the first seat than is the second portion, whereby the slot is widened in response to travel of the second projection to the second portion.

The invention also relates to a key for displacing a clamping arm of an insert holder to widen the slot formed between the clamping arm and the base portion of the holder. The key comprises a shaft having a length and at least one pair of parallel projections spaced longitudinally apart along the shaft by a distance which is between $\frac{1}{10}$ and $\frac{1}{3}$ of the shaft length.

Preferably, a first of the projections is of circular cross-section, and a second of the projections is of oval cross-section.

The invention also pertains to a method of utilizing the key to widen the insert slot. The method includes inserting the first and second projections into the first and second seats, respectively, whereby the second projection engages the first portion of the oblong surface. Then, the key is rotated about an axis of the first projection to cause the second projection to travel along the oblong surface from the first portion thereof to the second portion, to force the clamping arm elastically away from the first slot face for widening the slot.

Preferably, the oblong surface includes a recess at the second portion for retaining the second projection.

BRIEF DESCRIPTION OF THE DRAWING

The objects and advantages of the invention will become apparent from the following detailed description of the preferred embodiments thereof in connection with the accompanying drawing in which like numerals designate like elements and in which.

DETAILED DESCRIPTION OF PREFERRED EMBODIMENTS OF THE INVENTION

Figure 4:
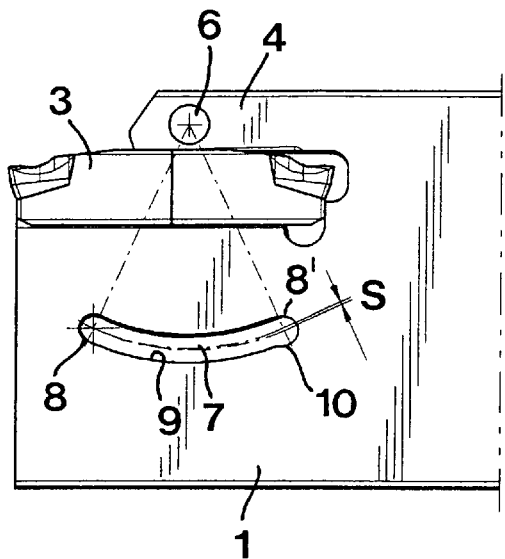
FIG. 4 is a partial side view showing an insert holder of blade type and a cutting insert mounted therein.
Figure 5:
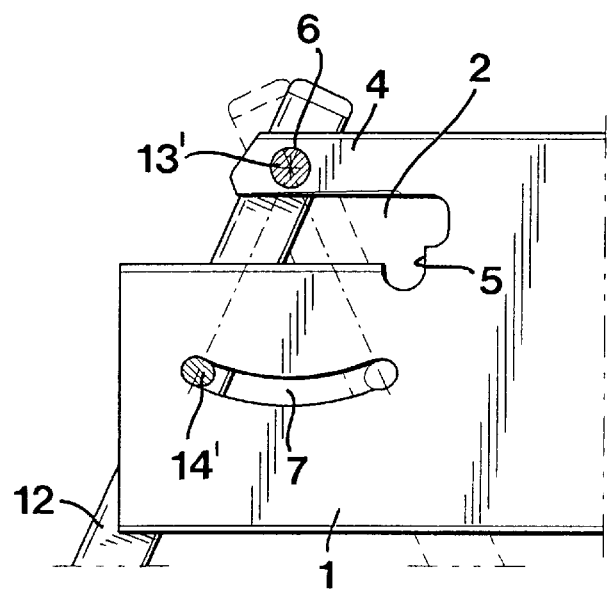
FIG. 5 is a side view corresponding to FIG. 4, said side view showing the same insert holder without the cutting insert and with an applied key.

Reference is first made to FIGS. 4 and 5 illustrating an insert holder having the shape of a blade-shaped body 1, an outwardly opening slot or recess 2 being provided in said body 1, said slot or recess 2 being adapted to receive a cutting insert 3. The slot 2 is defined by, on one hand, a lower slot face disposed on a portion of the body 1, and on the other hand, by an upper slot face disposed on an elastically flexible clamping arm 4 having the function of clamping the cutting insert 3 in the slot 2. At the inner end of the slot 2 there is an abutment surface 5 against which the cutting insert abuts when mounted.

In the insert holder two different seats 6, 7 are provided, which may either be designed as through holes opening at both sides of the body, or as recesses of limited depth opening only at one side of the body. Thus, the seats open in a direction extending laterally of the plane of the body 1. One of the seats 6 is cylindrical and in the disclosed embodiment is located in the clamping arm 4. The other seat 7 is located in the area below the slot 5 and, in accordance with the present invention, has an oblong groove shape. In the embodiment according to FIGS. 4 and 5 the seat 7 is arcuate in shape and extends between opposite end portions designated by 8, 8', which are located at different respective distances from the seat 6. More specifically, the seat 7 is limited by a lower oblong arcuate surface 9 that at the end 8' is converted into a shallow recess 10. The seat 7 is located in such a way that the radial distance from the bottom of said recess 10 is somewhat smaller than the radial distance between the seat 6 and the bottom surface 9 at the end 8. The difference in distance or radius, indicated by the designation S in FIG. 4, may in practice constitute fractions of a millimetre. For instance, the difference in distance S may be within the interval 0.2–1.0 mm, preferably 0.3–0.7 mm.

Figure 1:
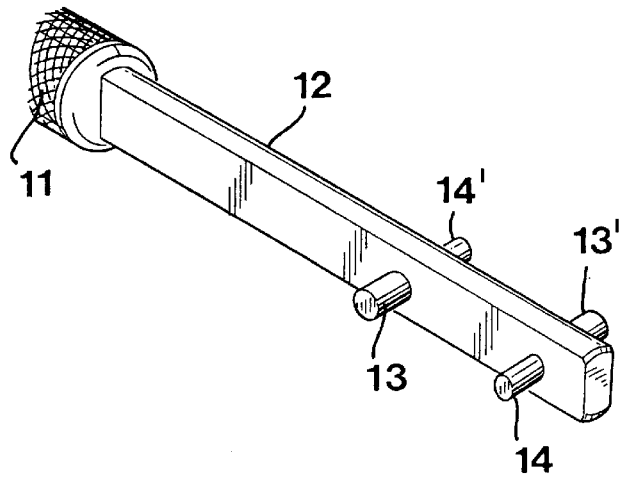
FIG. 1 is a partial perspective view of a key according to the invention.
Figure 2:
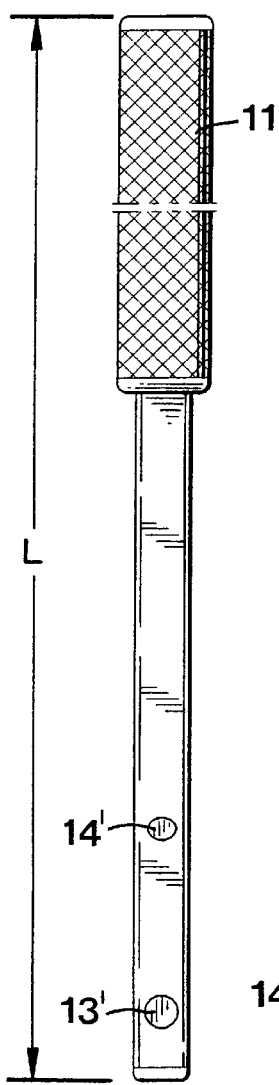
FIG. 2 is a side view of an alternative embodiment of the key according to the invention.
Figure 3:
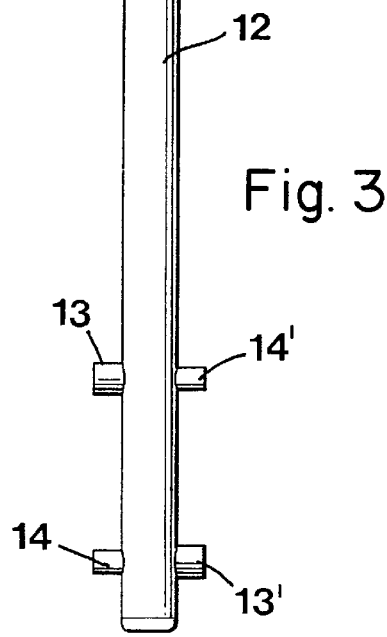
FIG. 3 is an analogous side view turned 90° from FIG. 2.

Reference is now made to FIGS. 1–3 illustrating two alternative embodiments of a lever key according to the invention. Generally, said key comprises a shaft 12 on which is disposed a handle member 11. The shaft 12 has at least one pair of axially spaced parallel projections 13, 14 extending laterally therefrom with respect to a longitudinal axis of the shaft. The only difference between the embodiment according to FIG. 1 and the embodiment according to FIGS. 2 and 3 is that the shaft, in the first case, has a rectangular cross-section, i.e. the shaft sides are flat, while the shaft according to FIGS. 2 and 3 is cylindrical (i.e., circular in cross-section).

The first projection 13 on the shaft 12 preferably has the shape of a cylindrical stud (i.e., of circular cross section) whose diameter is only a little smaller than the diameter of the cylindrical seat 6. This means that the stud 13 projects at a right angle from the shaft 12. However, the cross-section of the stud 14 is preferably oval or elliptic, more precisely wherein the major axis of the ellipse is oriented perpendicular to the longitudinal axis of the shaft. By this oval or elliptic shape of the stud, the stud makes surface contact rather than line contact against the bottom surface 9 of the groove 7 to facilitate the displacement of the stud along the bottom surface 9.

The distance between the two studs 13 and 14 is larger than 1/10 of the entire length L of the shaft 12 and smaller than 1/3 of the entire length of the shaft 12, i.e., the distance is between 1/10 L and 1/3 L. The length of the shaft, as well as the distance between the studs, may vary depending on the type of insert holder that is to he treated. However, the length L of the shaft 12 should be in the range of 100–200 mm, and the distance between the studs may be within the range of 20–60 mm.

In accordance with a preferred embodiment of the invention, opposite pairs of projections are provided on the shaft 12. At the side of the shaft that is opposite to the cylindrical stud 13 and the oval stud 14 there are disposed a cylindrical stud 13' and an oval stud 14' that are aligned with studs 13 and 14, respectively.

In FIG. 5 it is shown how the key is attached to the insert holder 1, more precisely with the cylindrical stud 13' mounted in the cylindrical seat 6 and the oval stud 14' engaging the arcuate groove 7. Thus, in this case the key is oriented downwards from the insert holder. If the operator wishes to direct the key upwards from the insert holder, said key may be inverted and reversed so that the stud 13 engages the cylindrical seat 6 and the oval stud 14 engages the groove 7. From the starting position shown in FIG. 5 the key shaft is turned counterclockwise around the fulcrum defined by the seat 6 and the stud 13'. Hereby the projection 14' is moved from one end 8 of the groove 7 to the opposite end 8', whereby the stud glides along the bottom surface 9. Due to the fact that the groove is so oriented relative to the seat 6 that the radial distance from the surface 9 to the seat 6 is shortened gradually as the projection 14' approaches the end 8', the elastically flexible clamping arm 4 will progressively bend outwards far enough to allow the insert 3 to be removed from the slot 2. When the stud 14' reaches the end portion 8' of the groove it will enter, and be retained in, the recess 10. In other words, the operator does not need to apply any force upon the key to keep the clamping arm 4 bent outwards. Therefore, it is not necessary to keep manually actuating the key until a new (or indexed) insert is introduced into the slot.

It should be pointed out that the radial distance between the seat 6 and the recess 10 is somewhat larger than the corresponding distance from the seat 6 to the bottom surface 9 in the immediate vicinity of the recess 10. Nevertheless the radial distance between the recess 10 and the seat 6 is smaller than the corresponding radial distance at the opposite end 8 of the groove 7.

Figure 6:
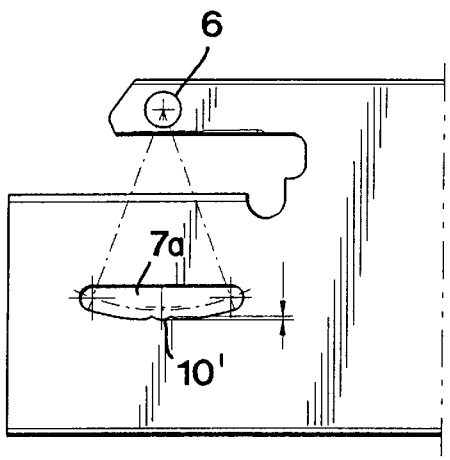
FIGS. 6-6A show an alternative embodiment of the insert holder according to the invention.
Figure 6A:
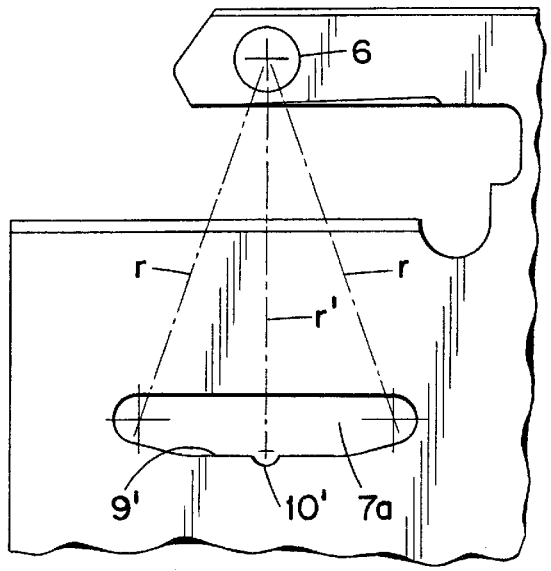

In FIGS. 6 and 6A an alternative embodiment of the insert holder is shown, wherein the oblong seat or groove 7a has its opposite ends located at equal distances from the seat 6, i.e., the two radii r are equal. The bottom surface 9' becomes progressively closer to the seat 6 toward a center of the surface 9' where there is located a recess 10' (i.e., r'<r). In this case the key may be turned inwards from either one of the two opposite ends of the groove to effect handing outwards of the clamping arm when the stud reaches the recess 10'.

Figure 7:
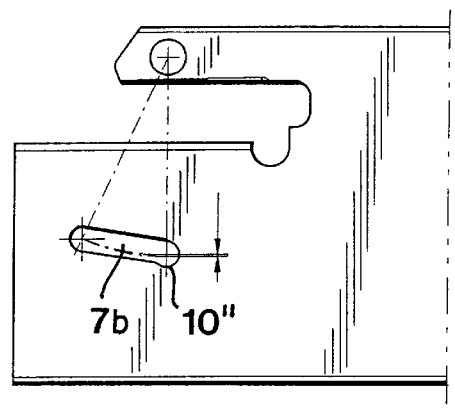
FIGS. 7 and 8 show two more alternative embodiments, respectively.
Figure 8:
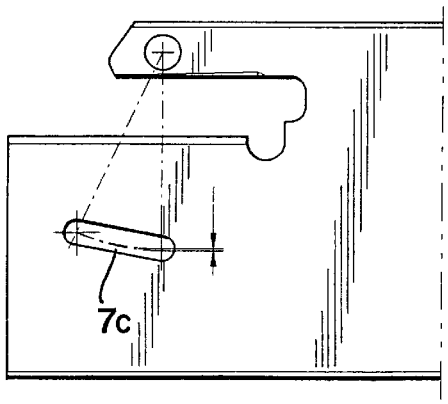

In FIGS. 7 and 8 are shown examples of straight grooves 7b, 7c. The groove 7b according to FIG. 7 includes a recess 10" at one end thereof, while the groove 7c according to FIG. 8 has no position-maintaining recess such as the recess 10".

In practice, the geometric shape of the oblong seat may be varied in many ways. Thus, it is essential for the invention only that said seat generally has an oblong shape and that the distance between the fulcrum and an oblong surface of the seat becomes progressively smaller when a second projection is displaced along the surface. Although it is preferred to locate the fulcrum seat in the clamping arm and the oblong seat in the body of the insert holder, as is shown in the drawings, it is feasible to arrange this in a reversed way, i.e. to locate the oblong seat in the clamping arm and the fulcrum seat in the body.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An insert holder for holding a cutting insert, the holder comprising a blade-shaped body defining a plane and having:
    a base portion including a first slot face;
    a clamping arm including a second slot face spaced from the first slot face to form therewith a slot in which a cutting insert can be removably mounted, the clamping arm joined to the base portion to be elastically movable away from the first slot face to facilitate insertion and removal of the cutting insert;
    first and second seats disposed in the body for receiving respective first and second projections of a turning key to elastically move the clamping arm away from the first slot face with the first seat acting as a fulcrum, each of the first and second seats opening in a direction laterally of the plane of the body, one of the first and second seats disposed in the base portion, and the other of the first and second seats disposed in the clamping arm;
    the improvement wherein:
        the second seat includes an oblong surface along which the second projection can travel between first and second portions of the oblong surface, and
        the first portion of the oblong surface is spaced farther from the first seat than is the second portion, whereby the slot is widened in response to travel of the second projection to the second portion.

2. The insert holder according to claim 1 wherein the second portion of the oblong surface includes a recess for retaining the second projection.

3. The insert holder according to claim 2 wherein the first seat is disposed in the clamping arm and the second seat is disposed in the base portion.

4. The insert holder according to claim 1 wherein the first seat is disposed in the clamping arm and the second seat is disposed in the base portion.

5. The insert holder according to claim 1 wherein the first and second portions of the oblong surface constitute respective opposite ends of the oblong surface.

6. The insert holder according to claim 1 wherein the first portion of the oblong surface constitutes one end of the oblong surface, the oblong surface including a third portion constituting an opposite end thereof, the first and third portions spaced by equal distances from the fulcrum, the second portion disposed between the first and third portions.

7. A method of widening an insert slot of an insert holder for facilitating the insertion/removal of a cutting insert, the insert slot comprising a blade-shaped body defining a plane and having a base portion including a first slot face, a clamping arm including a second slot face spaced from the first slot face to form therewith the insert slot, the clamping arm joined to the base portion to be elastically movable away from the first slot face to facilitate insertion and removal of the cutting insert, first and second seats disposed in the body and opening in a direction laterally of the plane of the body, one of the first and second seats disposed in the base portion, and the other of the first and second seats disposed in the clamping arm, the second seat including an oblong surface having first and second spaced apart portions, wherein the first portion is spaced farther from the first seat than is the second portion, the method comprising the steps of:
    A) providing a key comprising a shaft and at least first and second parallel projections spaced longitudinally apart and extending laterally from the shaft;
    B) inserting the first and second projections into the first and second seats, respectively, whereby the second projection engages the first portion of the oblong surface;
    C) rotating the key about an axis of the first projection to cause the second projection to travel along the oblong surface from the first portion thereof to the second portion to force the clamping arm elastically away from the first slot face for widening the slot.

* * * * *